US010493951B2

(12) United States Patent
Ortiz et al.

(10) Patent No.: US 10,493,951 B2
(45) Date of Patent: Dec. 3, 2019

(54) INTEGRATED WIRING FOR A MOTOR VEHICLE SEAT RESTRAINT SYSTEM

(71) Applicant: INDIANA MILLS & MANUFACTURING, INC., Westfield, IN (US)

(72) Inventors: Jean Paul Ortiz, Indianapolis, IN (US); Kyle M. Paulson, Indianapolis, IN (US); P. Jason Davis, Crawfordsville, IN (US)

(73) Assignee: Indiana Mills & Manufacturing, Inc., Westfield, IN (US)

( * ) Notice: Subject to any disclaimer, the term of this patent is extended or adjusted under 35 U.S.C. 154(b) by 4 days.

(21) Appl. No.: 15/770,618

(22) PCT Filed: Nov. 16, 2016

(86) PCT No.: PCT/US2016/062181
§ 371 (c)(1),
(2) Date: Apr. 24, 2018

(87) PCT Pub. No.: WO2017/087459
PCT Pub. Date: May 26, 2017

(65) Prior Publication Data
US 2018/0297554 A1   Oct. 18, 2018

Related U.S. Application Data

(60) Provisional application No. 62/257,539, filed on Nov. 19, 2015.

(51) Int. Cl.
*B60R 22/12* (2006.01)
*B60R 22/48* (2006.01)
(Continued)

(52) U.S. Cl.
CPC ............. *B60R 22/48* (2013.01); *B60N 2/688* (2013.01); *B60R 16/0215* (2013.01);
(Continued)

(58) Field of Classification Search
CPC .. B60R 22/12; B60R 2022/4816; B60R 22/48
(Continued)

(56) References Cited

U.S. PATENT DOCUMENTS 3,133,277 A * 5/1964 Hood ...................... B60R 22/48
                                                123/198 D
3,449,714 A * 6/1969 Farley, Jr. ............... B60R 22/48
                                                  180/270

(Continued)

FOREIGN PATENT DOCUMENTS

JP    03060457    6/1991
JP    2007261471   10/2007

OTHER PUBLICATIONS

PCT International Search Report and Written Opinion of PCT/US2016/062181, dated Mar. 14, 2017, 15 pages.

*Primary Examiner* — Ruth Ilan
(74) *Attorney, Agent, or Firm* — Barnes & Thornburg LLP

(57) ABSTRACT

A motor vehicle seat restraint system may include a tongue or buckle and an electrical component carried thereby, an elongated restraint web coupled to the tongue or buckle, the restraint web having a first side and a second side opposite the first side, an outer surface between the first and second sides and an inner surface opposite the outer surface, a channel member coupled to and between the inner and outer surfaces of the restraint web adjacent to the first side of the restraint web and extending along at least a portion of a length thereof, the channel member and the first side of the restraint web defining a passageway therebetween, and one or more electrical wires operatively coupled to the electrical (Continued)

component and extending into and through the passageway such that the one or more electrical wires ride within the channel member along-side the restraint web.

20 Claims, 3 Drawing Sheets

(51) Int. Cl.
    *B60R 22/18*     (2006.01)
    *B60R 16/02*     (2006.01)
    *B60N 2/68*     (2006.01)
    *B60R 22/02*     (2006.01)

(52) U.S. Cl.
    CPC ........ *B60R 22/12* (2013.01); *B60R 2022/027* (2013.01); *B60R 2022/1818* (2013.01); *B60R 2022/4816* (2013.01)

(58) Field of Classification Search
    USPC ...................................................... 340/457.1
    See application file for complete search history.

(56) References Cited

U.S. PATENT DOCUMENTS

| | | | | |
|---|---|---|---|---|
| 4,060,878 | A * | 12/1977 | Dyki | A44B 11/2511 |
| | | | | 200/61.58 B |
| 4,169,614 | A * | 10/1979 | Ellens | B60R 22/48 |
| | | | | 280/801.1 |
| 4,667,336 | A * | 5/1987 | Best | B60R 22/48 |
| | | | | 180/270 |
| 6,540,040 | B1 * | 4/2003 | Patel | B60R 22/48 |
| | | | | 180/268 |
| 6,581,960 | B1 * | 6/2003 | Schondorf | B60R 21/01546 |
| | | | | 180/273 |
| 7,520,533 | B1 * | 4/2009 | Skaurud | B60R 22/48 |
| | | | | 280/808 |
| 9,738,252 | B1 * | 8/2017 | Shoda | B60R 22/48 |
| 2002/0008376 | A1 * | 1/2002 | Wittenberg | B60R 22/12 |
| | | | | 280/801.1 |
| 2014/0303851 | A1 | 10/2014 | Nagasawa, Sr. | |

* cited by examiner

INTEGRATED WIRING FOR A MOTOR VEHICLE SEAT RESTRAINT SYSTEM

CROSS-REFERENCE TO RELATED APPLICATION

This application is the U.S. national phase of PCT/US2016/062181 filed Nov. 16, 2016. PCT/US2016/062181 claims the benefit of and priority to U.S. provisional patent application Ser. No. 62/257,539 filed Nov. 19, 2015, the disclosure of which is expressly incorporated herein by reference.

FIELD OF THE INVENTION:

The present invention relates generally to restraint systems for motor vehicles, and more specifically to routing of electrical wires for restraint systems which include one or more sensors and/or electronically controlled actuators and/or electronically controlled indicators.

BACKGROUND

Occupant restraint systems for motor vehicles that include one or more electronic sensors and/or electronically controlled actuators and/or electronically controlled indicators are known. In such restraint systems, electric wiring must be routed to such sensor(s) and/or actuator(s) and/or indicator(s) to supply electrical power and/or to carry sensory and/or control signals.

SUMMARY

The present invention may comprise one or more of the features recited in the attached claims, and/or one or more of the following features and combinations thereof. In one aspect, a motor vehicle seat restraint system including integrated electrical wiring may comprise one of a tongue member and a buckle member, an electrical component carried by the one of the tongue member and the buckle member, a first elongated restraint web coupled at one end to the one of a tongue member and a buckle member, the first restraint web having a first side and a second side opposite the first side, an outer surface between the first and second sides and an inner surface opposite the outer surface, a channel member coupled to and between the inner and outer surfaces of the first restraint web adjacent to one of the first and second sides of the first restraint web and extending along at least a portion of a length of the first restraint web, the channel member and the one of the first and second sides of the first restraint web defining a passageway therebetween, and one or more electrical wires operatively coupled to the electrical component and extending into and through the passageway such that the one or more electrical wires ride within the channel member alongside the first restraint web.

In another aspect, a motor vehicle seat restraint system including integrated electrical wiring may comprise a restraint harness coupled to a motor vehicle seat, the restraint harness including a lap restraint web attached to a tongue or buckle member and a shoulder restraint web coupled at one end thereof to the lap restraint web adjacent to or near the tongue or buckle, the shoulder web configured to extend over a shoulder and at least partially along a front torso of an occupant of the motor vehicle seat, the shoulder restraint web having a first side and a second side opposite the first side, an outer surface between the first and second sides and an inner surface opposite the outer surface and facing the motor vehicle seat, an electrical component carried by the tongue or buckle member, a channel member coupled to and between the inner and outer surfaces of the shoulder restraint web adjacent to and along one of the first and second sides of the shoulder restraint web such that the channel member and the one of the first and second sides of the shoulder restraint web define a passageway therebetween, and one or more electrical wires operatively coupled to the electrical component and extending into and through the passageway such that the one or more electrical wires ride within the channel member alongside the shoulder restraint web.

In yet another aspect, a motor vehicle seat restraint system including integrated electrical wiring may comprise a web guide coupled to a seat back of a motor vehicle seat and defining a slot therethrough having a first width, a restraint harness coupled to the motor vehicle seat, the restraint harness including a lap restraint web attached to a tongue or buckle member and a shoulder restraint web coupled at one end thereof to the lap restraint web adjacent to or near the tongue or buckle, the shoulder web configured to extend through the web guide and over a shoulder and at least partially along a front torso of an occupant of the motor vehicle seat, the shoulder restraint web having a first side and a second side opposite the first side, an electrical component carried by the tongue or buckle member, a channel member coupled to the shoulder restraint web adjacent to and along one of the first and second sides of the shoulder restraint web such that the channel member and the shoulder restraint web define a passageway therebetween, the combination of the shoulder restraint web and the channel member defining a second width between the other of the first and second sides of the shoulder restraint web and an outer edge of the channel member opposite the one of the first and second sides of the shoulder restraint web, the second width less than the first width, and one or more electrical wires operatively coupled to the electrical component and extending into and through the passageway such that the one or more electrical wires ride within the channel member alongside the shoulder restraint web.

BRIEF DESCRIPTION OF THE DRAWINGS

This disclosure is illustrated by way of example and not by way of limitation in the accompanying Figures. Where considered appropriate, reference labels have been repeated among the Figures to indicate corresponding or analogous elements.

DETAILED DESCRIPTION OF THE DRAWING

Figure 1:
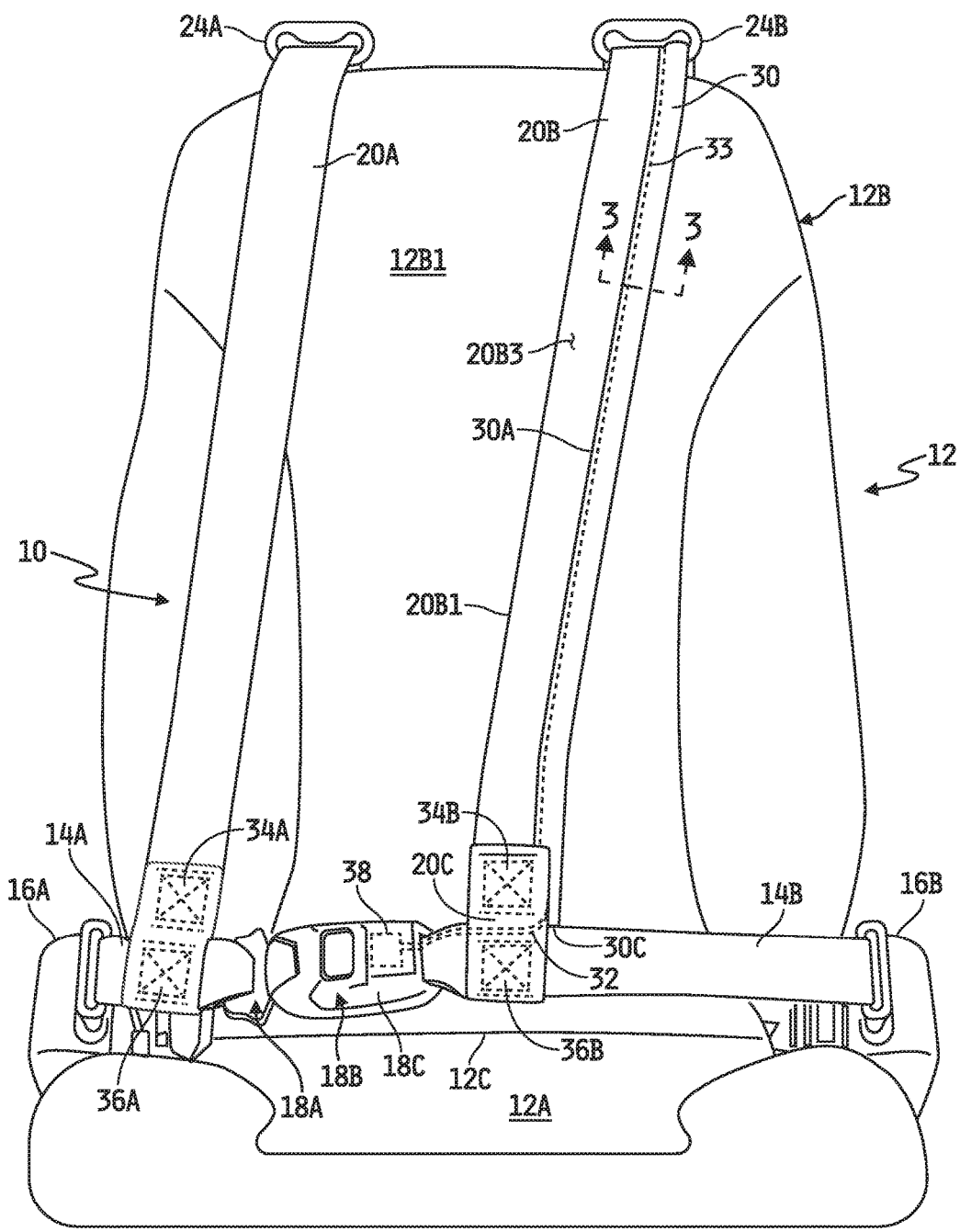
FIG. 1 is a front plan view of a motor vehicle seat with an occupant restraint system including integrated wiring for an electrical sensor and/or electronically controlled actuator and/or electronically controlled indicator carried by the restraint system.

While the concepts of the present disclosure are susceptible to various modifications and alternative forms, specific exemplary embodiments thereof have been shown by way of example in the drawing and will herein be described in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases may or may not necessarily refer to the same embodiment. Further, when a particular feature, structure or characteristic is described in connection with an embodiment, it is submitted that it is within the knowledge of one skilled in the art to effect such feature, structure or characteristic in connection with other embodiments whether or not explicitly described. Further still, it is contemplated that any single feature, structure or characteristic disclosed herein may be combined with any one or more other disclosed feature, structure or characteristic, whether or not explicitly described, and that no limitations on the types and/or number of such combinations should therefore be inferred.

Figure 2:
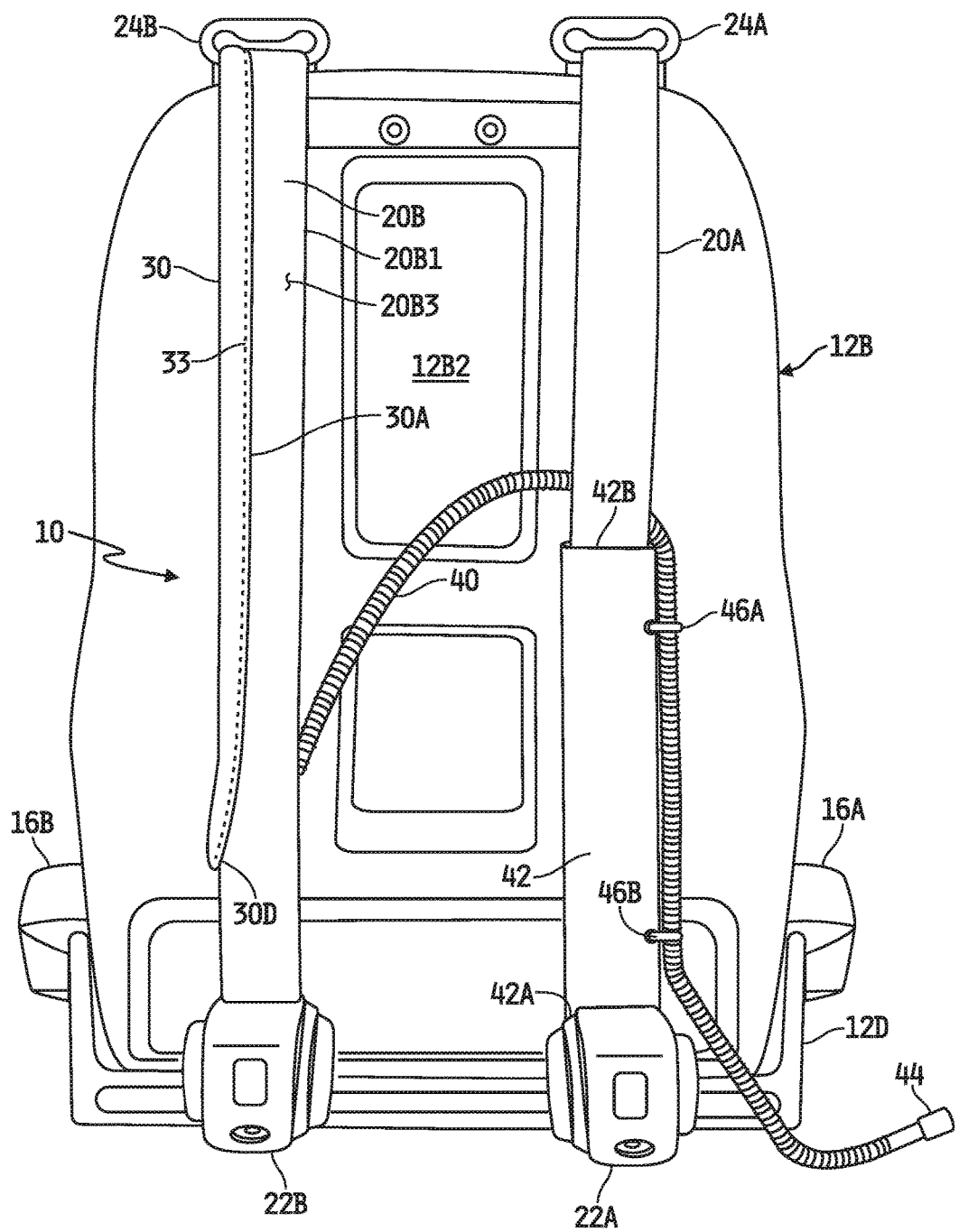
FIG. 2 is a rear view of the motor vehicle seat illustrated in FIG. 1.

Referring now to FIGS. 1-2, a motor vehicle seat 12 is shown with an embodiment of an occupant restraint system 10 coupled thereto. The occupant restraint system 10 illustratively includes and incorporates therein integrated wiring 32 for an electrical sensor, electronically controlled actuator and/or electronically controlled indicator 38 carried by the restraint system 10. In the illustrated embodiment, the motor vehicle seat 12 is conventional and includes a seat bottom 12A coupled to a seat back 12B having a front or forward-facing surface 12B1 and an opposite rear or rearwardly-facing surface 12B2. The motor vehicle in which the motor vehicle 12 seat is mounted may be any conventional motor vehicle, examples of which include, but are not limited to, an industrial vehicle, e.g., construction and/or mining equipment, farm equipment, excavation equipment and/or other heavy equipment, a lift truck, a recreational vehicle such as an all-terrain vehicle (ATV), dune buggy or other off-road vehicle, an automobile, a light, medium or heavy-duty truck, an electric vehicle, a utility vehicle, a commercial vehicle, a racing vehicle, and the like.

In the illustrated embodiment, the restraint system 10 is a multi-point restraint harness; in particular, a so-called four-point restraint harness including two lap webs 14A, 14B, each configured to extend over a portion of a lap of an occupant of the seat 12, and two shoulder webs 20A, 20B, each configured to extend over a different shoulder of the occupant, down the front of the occupant's torso and into engagement with one of the lap webs 14A, 14B respectively. It will be understood that in alternative embodiments, the restraint harness 10 may include more or fewer points of restraint, and/or one or more of the lap and/or shoulder webs may be coupled, affixed or otherwise attached to the vehicle seat 12 and/or to another of the webs differently than is illustrated in FIGS. 1 and 2 but which is in any case conventional.

In the embodiment illustrated in FIGS. 1 and 2, the restraint system 10 illustratively includes a conventional web retractor 16A mounted to one side of the vehicle seat 12 adjacent to a bight 12C of the seat 12 defined here as the interface or region extending along the vehicle seat 10 from one side to the other between the front or forward-facing surface 12B1 of the seat back 12B and the seat bottom 12A. Illustratively, the web retractor 16A is attached or affixed to a frame 12D to which the seat bottom 12A and the seat back 12B are mounted, as illustrated most clearly in FIG. 2. One end of the lap web 14A is operatively coupled to a conventional spool within the web retractor 16A, and a conventional tongue member 18A is coupled to an opposite end of the lap web 16A. The web retractor 16A may be a locking or a non-locking web retractor.

Another conventional web retractor 16B is mounted to an opposite side of the vehicle seat adjacent to the bight 12C. Illustratively, the web retractor 16B is attached or affixed to a frame 12D to which the seat bottom 12A and the seat back 12B are mounted, as illustrated most clearly in FIG. 2. One end of the lap web 14B is operatively coupled to a conventional spool within the web retractor 16B, and a conventional buckle member 18B is coupled to an opposite end of the lap web 14B. The web retractor 16B may be a locking or non-locking web retractor. In any case, the tongue member 18A and the buckle member 18B are configured to be releasably engaged with each other in a conventional manner, and in some alternative embodiments the tongue member 18A may be coupled to the free end of the lap web 14B and the buckle member 18B may be coupled to the free end of the lap web 14A. In some such embodiments and/or in other alternative embodiments, either or both of the web retractors 16A, 16B may be omitted and replaced with a non-retracting web anchor, and lap web length adjustments in such embodiments may be accomplished via one or more conventional, manually actuated web length adjusters positioned in-line with the lap web 14A and/or the lap web 14B, and/or incorporated into the tongue member 18A and/or the buckle member 18B.

In the illustrated embodiment, the restraint system 10 further illustratively includes a conventional web retractor 22A mounted to the rear of the vehicle seat 12, e.g., to the frame 12D to which the seat bottom 12A and the seat back 12B are mounted, adjacent to or near one side of the seat 12, e.g., the side of the vehicle seat 12 to which the web retractor 22A is mounted. The web retractor 22A may be a locking or non-locking web retractor. One end of the shoulder web 20A is operatively coupled to a conventional spool within the web retractor 22A, and the opposite end of the web 20A is passed through a conventional web guide 24A mounted to or near the top of the seat back 12B and then attached to the lap web 14A, e.g., adjacent to the tongue member 18A.

Another conventional web retractor 22B is mounted to the rear of the vehicle seat 12, e.g., to the frame 12D to which the seat bottom 12A and the seat back 12B are mounted, adjacent to or near the opposite side of the seat 12, e.g., the side of the vehicle seat 12 to which the web retractor 22B is mounted. The web retractor 22B may be a locking or non-locking web retractor. One end of the shoulder web 20B is operatively coupled to a conventional spool within the web retractor 22B, and the opposite end of the web 20B is passed through another conventional web guide 24B mounted to the top of the seat back 12B and then attached to the lap web 14B adjacent to the buckle member 18B. In some alternative embodiments, either or both of the web retractors 22A, 22B may be omitted and replaced with a non-retracting web anchor, and lap web length adjustments in such embodiments may be accomplished via one or more conventional, manually actuated web length adjusters positioned in-line with the shoulder web 20A and/or the shoulder web 20B, and/or incorporated into the tongue member 18A and/or the buckle member 18B.

The web retractors 16A, 16B, 22A and 22B are each illustratively conventional in structure and operation in that each web retractor 16A, 16B, 22A and 22B is configured to automatically retract an associated web 14A, 14B, 20A, 20B therein, e.g., via biased rotation of an associated web spool, and selectively pay out an associated web 14A, 14B, 20A, 20B therefrom in a conventional manner.

In the illustrated embodiment, the attachment of the shoulder web 20A to the lap web 14A is accomplished by looping the free end of the shoulder web 20A around the lap web 14A and then attaching the web 20A adjacent to its free end to itself, e.g., via stitching 34A, and to the lap web 14A, e.g., via stitching 36A, and the attachment of the shoulder web 20B to the lap web 14B is likewise accomplished by looping the free end of the shoulder web 20B around the lap web 14B and then attaching the web 20B adjacent to its free end to itself, e.g., via stitching 34B, and to the lap web 14B, e.g., via stitching 36B. It will be understood that any one or more conventional attachment structure(s) and/or media may be used alternatively to or in addition to the stitching 34A/34B and/or 36A/36B, examples of which include, but are not limited to, one or more clips, rivets, clamps, screws, nut/bolt combinations, adhesives or other bonding media, thermal joining techniques and the like. In some alternate embodiments, the free end of the shoulder web 20A and/or the free end of the shoulder web 20B may be coupled directly to the tongue member 18A and/or the buckle member 18B respectively.

As shown by dashed-line representation in FIG. 1, an electrical component 38 is illustratively carried by, e.g., mounted to and/or within, a housing 18C of the buckle member 18B. In some embodiments, the electrical component 38 may be or include a sensor configured to produce sensory signals indicative of one or more conditions or states of the buckle member 18B and/or of one or more events to which the buckle member 18B is subjected. Examples of such conditions, states and/or events include, but are not limited to, disengagement with the tongue member 18A, a force applied to the buckle member 18B by the tongue member 18A and/or by the lap web 14B, movement of, or position of, the buckle member 18B and/or the lap web 14B relative to the web retractor 16B and/or the web retractor 22B, and the like. In other embodiments, the electrical component 38 may alternatively or additionally be or include one or more electronically controlled actuators responsive to one or more control signals to actuate and de-actuate. Examples of such one or more actuators include, but are not limited to, one or more electronically controlled tongue engagement/disengagement latches, one or more rotatable wheels, gears or springs, one or more linearly translatable springs, plates or tabs and the like. In still other embodiments, the electrical component 38 may alternatively or additionally be or include one or more electronically controlled indicators responsive to one or more control signals to produce a visual, audible and/or tactile indication. Examples of such one or more indicators include, but are not limited to, one or more lamps, light emitting diodes, color-coded wheels or tabs and/or other visual indicator devices, one or more beepers, chimes and/or other audible alarm device(s), one or more buzzers, vibration devices or other tactile indication devices and the like.

Figure 4:
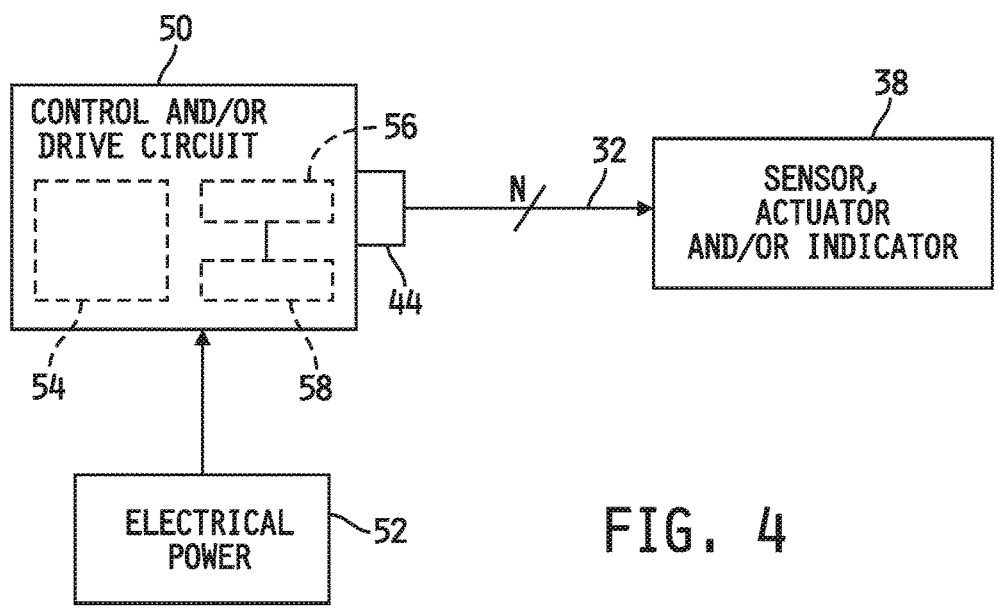
FIG. 4 is a simplified schematic diagram of an example motor vehicle electrical system in which the wiring and the sensor and/or actuator and/or indicator of FIGS. 1-3 is implemented.

Referring now to FIG. 4, the electronic component 38 is electrically connected via a number, N, of electrical wires 32 or electrical conductors to a conventional electrical connector 44. The electrical connector 44 is illustratively configured to be electrically connected to a control and/or drive circuit 50, and the control and/or drive circuit 50 illustratively receives electrical power from an electrical power source 52. In some embodiments, the electrical power source 52 is an electrical power line that is active, i.e., electrically powered, only when the vehicle ignition system has been activated, i.e., during key on, starting and/or when an engine carried by the motor vehicle is running. In other embodiments, the electrical power source 52 may be an electrical power line, e.g., the motor vehicle battery, which is always active. In still other embodiments, the electrical power source 52 may be an electrical power source, e.g., one or more batteries, separate from the motor vehicle electrical power line or source, which may or may not be carried by, coupled to or mounted in a common housing with the control and/or drive circuitry 50.

In some embodiments, at least one of the N electrical wires 32 is an electrical power line, and in such embodiments the control and/or drive circuit 50 provides electrical power directly from the electrical power source 52 to the electrical component 38 via the at least one of the N electrical wires 32. In other embodiments, the control and/or drive circuit 50 includes conventional regulator circuitry operable to convert the electrical power produced by the electrical power source 52 to voltage and/or current levels suitable for use by the electrical component 38, and in such embodiments the control and/or drive circuit 50 provides such regulated electrical power to the electrical component 38 via the at least one of the N electrical wires.

In some embodiments, at least another one of the N electrical wires 32 is a signal wire via which the control and/or drive circuit 50 supplies control signals to the electrical component 38 and/or via which the electrical component 38 supplies sensory signals to the control and/or drive circuit 50. In some alternate embodiments, the control and/or drive circuit 50 may be configured to supply such control signals and/or to receive such sensory signals via an electrical power wire, and in such embodiments the at least another one of the electrical wires N is not needed or may be used for another purpose. In any case, in embodiments in which the control and/or drive circuit 50 is operable to supply control signals to the electrical component 38 and/or in which the electrical component 38 supplies sensory signals to the control and/or drive circuit 50, the control and/or drive circuit 50 illustratively includes conventional circuitry for producing such control signals and/or for processing such sensory signals. In some embodiments, such circuitry may be provided entirely in the form of one or more hardware circuits and/or electrical components 54 as illustrated in dashed-line representation in FIG. 4. Alternatively or additionally, such circuitry may be provided in the form of electrical circuitry that includes at least one conventional processor or processor circuit 56 and at least one memory or memory circuit 58, as also shown in dashed-line representation in FIG. 4. In such embodiments, the memory or memory circuit 58 illustratively has instructions stored therein which, when executed by the at least one processor or processor circuit 56, cause the at least one processor or processor circuit 56 to produce such control signals and/or to process such sensory signals. In still other embodiments, such control and/or drive circuitry 50 may be provided in the form of a combination of the above two types of circuitry.

In some embodiments, at least one of the N electrical wires 32 is a ground or reference wire via which a ground or other reference potential is supplied by the control and/or drive circuit 50 to the electrical component 38. In some alternate embodiments, the ground or reference potential may instead be supplied to the electrical component via another source, and in such embodiments the at least one of the electrical wires N is not needed to supply a ground or other reference potential to the electrical component 38.

Referring again to FIGS. 1 and 2, the N electrical wires 32 are illustrated in the form of two such electrical wires 32, although it will be understood that more or fewer such electrical wires may be provided as just described. In the illustrated embodiment, the two electrical wires 32 illustratively exit the housing 18C of the buckle member 18B and are fed through folds or overlapped regions in the lap web 14B to an inner side $20B_1$ of the shoulder web 20B adjacent to the region of overlap of the shoulder web 20B between the stitched regions 34B and 36B. The two electrical wires 32 then extend through the region of overlap of the shoulder web 20B in a space 20C between the stitched regions 34B and 36B, and emerge therefrom at the outer side $20B_2$ of the shoulder web 20B as illustrated in FIG. 1.

Adjacent to the region of overlap of the shoulder web 20B between the stitched regions 34B and 36B, an elongated channel member 30 is attached to the outer surface 20B3 and to the inner surface 20B4 (see FIG. 3) of the shoulder web 20B along and adjacent to its longitudinal outer side 20B2 (see, e.g., FIG. 3), and the elongated channel member 30 illustratively extends along the longitudinal outer side 20B2 of the shoulder web 20B upwardly through the web guide 24B and then downwardly along the back or rearwardly-facing surface 12B2 of the seat back 12B toward the web retractor 22B. Such attachment of the elongated channel member 30 to the shoulder web 20B illustratively creates or defines a channel or passageway 31 (see FIG. 3) between the longitudinal outer side 20B2 of the shoulder web 20B and the elongated channel member 30 through which the two electrical wires 32 are illustratively fed. The two electrical wires 32 illustratively extend into the channel or passageway 31 defined by and between the longitudinal outer side 20B2 of the shoulder web 20B and the elongated channel member 30 via an open, front terminal end 30C of the channel member 30 as illustrated in FIG. 1, and the electrical wires 32 emerge from the channel or passageway 31 at an open, rear terminal end 30D of the channel member 30 adjacent to a lower portion of the back surface 12B2 of the seat back 12B as illustrated in FIG. 2. Between the open, front terminal end 30C and the open, rear terminal end 30D, the two electrical wires 32 extend through and along the channel or passageway 31 adjacent to the longitudinal outer side 20B2 of the shoulder web 20B.

Figure 3:
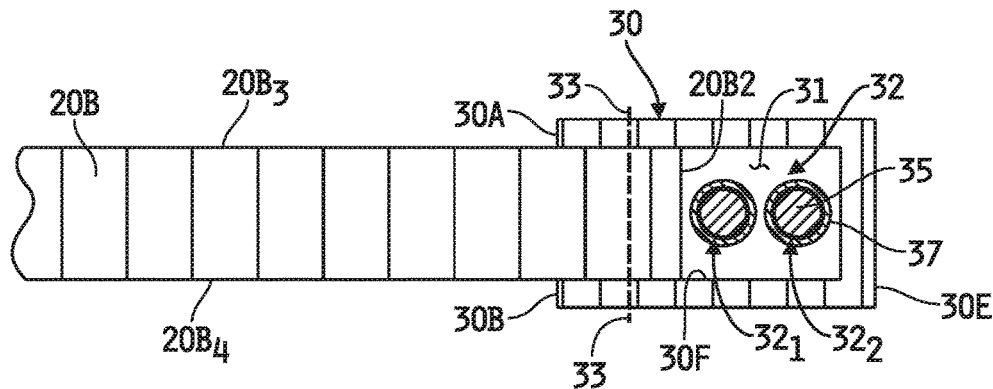
FIG. 3 is a cross sectional view of one of the shoulder webs of FIG. 1 as viewed along section lines 3-3 thereof and illustrating the sensor and/or actuator and/or indicator wiring carried thereby.

Referring now to FIG. 3, a cross-section is shown of the shoulder web 20B and elongated channel member 30 as viewed along the section lines 3-3 of FIG. 1. In the embodiment shown in FIG. 3, the elongated channel member 30 is illustratively provided in the form of an elongated and continuous, flexible or semi-flexible sheet having opposite sides 30A, 30B, and outer 30E and inner 30F surfaces which extend transversely between the opposite sides 30A, 30B and longitudinally between the opposite terminal ends 30C and 30D of the elongate channel member 30. The inner surface 30F of the channel member 30 adjacent to the side 30A thereof is illustratively placed in contact with the outer surface 20B3 of the shoulder web 20B near the longitudinal outer side 20B2 thereof, and the inner surface 30F of the channel member 30 adjacent to the side 30B thereof is similarly placed in contact with the inner surface 20B4 of the shoulder web 20B near the longitudinal outer side 20B2 thereof, such that the channel or passageway 31 is defined between the folded inner surface 30F of the elongated channel member 30 between its opposite sides 30A, 30B and the longitudinal outer side 20B2 of the shoulder web 20B. In some embodiments, as illustrated by example in FIG. 3, the opposite sides 30A, 30B of the channel member 30 are juxtaposed and aligned with each other, although in alternate embodiments the opposite sides 30A, 30B this may not be the case. In any case, the elongated channel member 30 is then attached or affixed to the shoulder web 20B to close the two opposing legs of the channel or passageway 31 against the shoulder web 20B. In the embodiment illustrated in FIGS. 1-3, the elongated channel member 30 is attached to the shoulder web 20B via stitching 33 which illustratively extends into and through the shoulder web 20B and the elongated channel member 30 at each of the inner 30F and outer 30E surfaces thereof between the aligned ends 30A, 30B of the channel member 30 and the longitudinal side 20B2 of the shoulder web 20B. In alternative embodiments, the inner surface 30F of the channel member 30 adjacent to the side 30B thereof may be affixed or attached to the inner 20B4 and outer 20B3 surfaces of the shoulder web 20B near the longitudinal outer side 20B2 thereof via one or more conventional bonding media and/or techniques.

Between the outer side 20B2 of the shoulder web 20B and the elongated channel member 30, a channel or passageway 31 is thus defined, into and through which two electrical wires $32_1$, $32_2$ extend from the front terminal end 30C of the channel member 30 adjacent to the region of overlap of the shoulder web 20B between the stitched regions 34B and 36B to and through the rear terminal end 30D thereof at a location along the back surface 12B2 of the seat back 12B. In the embodiment shown in FIG. 3, the electrical wires $32_1$, $32_2$ are illustratively separate from each other and each is provided in the form of one or more electrical conductors 35 surrounded by an electrically insulator or insulating layer 37. In alternate embodiments, the electrical wires $32_1$, $32_2$ may be non-electrically connected to each other along their length, e.g., via the insulating layer 37 of each. In any case, as illustrated by example in FIGS. 1 and 2, the channel member 30 is illustratively sized in width such that the channel or passageway 31 can receive the N electrical wires 32 therein and therethrough, and such that the combined width of the shoulder web 20B and the attached channel member 30 is less than the web slot width of the web guide 24B so that the combination of the shoulder web 20B and the channel member 30 attached thereto may freely pass in either direction through the web guide 24B. The front terminal end 30C of the channel member 30 is illustratively positioned adjacent to the region of overlap of the shoulder web 20B between the stitched regions 34B and 36B such that the wires 32 emerging from this region of the shoulder web 20B pass directly into the front terminal end 30C of the channel member 30. The length of the channel member 30 is illustratively sized such that the rear terminal end 30D terminates on the shoulder web 20B at a location along the back or rearwardly-facing surface 12B2 of the vehicle seat 12 that is sufficiently remote from the web retractor 22B to ensure that the channel member 30 will not interfere with or impinge upon the web retractor 22B with the shoulder web 20B in its fully retracted position, e.g., as illustrated in FIGS. 1 and 2, and that is also sufficiently remote from the web guide 24B to ensure that the rear terminal end 30D of the channel member 30 will not extend through the web guide 24B with the shoulder web 20B in a fully extended position thereof, i.e., fully payed out from the web retractor 22B.

In one illustrative embodiment, the electrical wires 32 are provided in the form of a 2-conductor, 18 AWG (American Wire Gauge) high-flex wire, and the channel member 30 is provided in the form of a 69 thread, Grosgrain binding tape cut approximately 1.5 inches wide and approximately 45 inches long, and attached via stitching 33 to and along the shoulder web 20B adjacent to the longitudinal outer side 20B2. In other embodiments, the channel member 30 may be provided in the form of one or more other conventional woven or other flexible or semi-flexible material(s), and may be attached to and along the shoulder web 20B using any conventional fixation or attachment structure(s) and/or media which allows the combination of the shoulder web 20B and the channel member 30 to freely pass through the web slot of the web guide 24B, examples of which include, but are not limited to, one or more clips, rivets, clamps, adhesives or other bonding media, thermal joining techniques and the like.

Referring again to FIG. 2 in particular, the electrical wires 32 emerging from the rear terminal end 30D of the channel member 30 pass into and through one end of a flexible or semi-flexible and electrically insulating wire guide 40. The opposite end of the wire guide 40 is coupled to the electrical connector 44, and the electrical wires 32 extending through the wire guide 40 are operatively connected to the electrical connector 44. In the illustrated embodiment, measures are taken to ensure that the electrical wires emerging from the terminal end 30D of the channel member 30 do not impinge upon or impede the operation of either of the web retractors 22A, 22B, and in this regard one end 42A of a hollow sleeve 42 is mounted to or adjacent to the web retractor 22A, and the hollow sleeve 42 receives the shoulder web 20A therein at the end 42A thereof, and the hollow sleeve 42 extends upwardly from the end 42A and the web retractor 22A to a free end 42B. In this embodiment, the shoulder web 20A rides within, i.e., extends through, the hollow sleeve 42 and is protected by the hollow sleeve 42 from contact with external structures such as the wire guide 40. In the illustrated embodiment, the wire guide 40 is further attached to and along the outside of the hollow sleeve 42 by conventional fixation members 46A, 46B, e.g., conventional wire ties. The wire guide 40 is thus routed between each of the shoulder webs 20A, 20B and the back or rearwardly-facing surface 12B2 of the seat back 12B, and is attached along the hollow sleeve 42 so as not to impinge upon or otherwise interfere with either of the shoulder webs 20A, 20B.

The structures 40, 42, 46A and 46B are shown and described only by way of example to demonstrate one illustrative arrangement for ensuring that the electrical wires 32 emerging from the terminal end 30D of the channel member 30 do not impinge upon or otherwise interfere with either of the shoulder webs 20A, 20B. Those skilled in the art will recognize other conventional structures and/or mechanisms for accomplishing this feature, and it will be understood that any such other structures and/or mechanisms are contemplated by this disclosure.

While the disclosure has been illustrated and described in detail in the drawings and foregoing description, such an illustration and description is to be considered as exemplary and not restrictive in character, it being understood that only illustrative embodiments have been shown and described and that all changes and modifications consistent with the disclosure and recited claims are desired to be protected.

What is claimed is:

1. A motor vehicle seat restraint system including integrated electrical wiring, comprising:
    one of a tongue member and a buckle member,
    an electrical component carried by the one of the tongue member and the buckle member,
    a first elongated restraint web coupled at one end to the one of the tongue member and the buckle member, the first restraint web having a first side and a second side opposite the first side, an outer surface between the first and second sides and an inner surface opposite the outer surface,
    a channel member coupled to and between the inner and outer surfaces of the first restraint web adjacent to one of the first and second sides of the first restraint web and extending along at least a portion of a length of the first restraint web, the channel member and the one of the first and second sides of the first restraint web defining a passageway therebetween, and
    one or more electrical wires operatively coupled to the electrical component and extending into and through the passageway such that the one or more electrical wires ride within the channel member alongside the first restraint web.

2. The motor vehicle seat restraint system of claim 1, further comprising a second restraint web attached to the one of the tongue member and the buckle member,
    wherein the first restraint web is attached at the one end thereof to the second restraint web and is coupled to the one of the tongue member and the buckle member via attachment to the second restraint web.

3. The motor vehicle seat restraint system of claim 2, wherein the first restraint web is a shoulder web of a restraint harness for a motor vehicle seat and the second restraint web is a lap web of the restraint harness.

4. The motor vehicle seat restraint system of claim 2, wherein the first web is attached to the second web adjacent to the one of the tongue member and the buckle member by wrapping a portion of the first web adjacent to the one end of the first restraint web around the second web and then attaching the one end of the first web to itself,
    and wherein a space is defined between the wrapped portion of the first web and the second web,
    and wherein the one or more electrical wires extend from the electrical component into and through the space and then from the space into the passageway defined by the channel member.

5. The motor vehicle seat restraint system of claim 4, wherein the channel member defines a first open terminal end adjacent to the space,
    and wherein the one or more electrical wires enter the passageway from the space via the first open terminal end.

6. The motor vehicle seat restraint system of claim 5, wherein the channel member defines a second open terminal end opposite the first open terminal end,
    and wherein the one or more electrical wires exit the passageway via the second open terminal end.

7. The motor vehicle seat restraint system of claim 1, further comprising:
    a motor vehicle seat having a seat base and a seat back mounted to the seat base, and
    a web guide mounted to the seat back and defining a web slot therethrough, the combination of the first restraint web and the channel member extending through the web slot.

8. The motor vehicle seat restraint system of claim 7, wherein the combination of the first restraint web and the channel member define a first width between the other of the first and second sides of the first restraint web and an outer edge of the channel member opposite the one of the first and second sides of the first restraint web,
    and wherein the web slot defines a second width,
    and wherein the first width is less than the second width.

9. The motor vehicle seat restraint system of claim 7, further comprising a web retractor mounted to the motor vehicle seat,
wherein an end of the first restraint web opposite the one end is operatively coupled to the web retractor.

10. The motor vehicle seat restraint system of claim 1, wherein the restraint system is a multi-point restraint system and the first restraint web is a shoulder web configured to extend over a shoulder and at least partially along a front torso of a motor vehicle seat occupant.

11. The motor vehicle seat restraint system of claim 1, wherein the channel member comprises a binding tape.

12. The motor vehicle seat restraint system of claim 1, wherein the electrical component comprises at least one of a sensor, an electrically controlled actuator and an electrically controlled indicator.

13. A motor vehicle seat restraint system including integrated electrical wiring, comprising:
a restraint harness coupled to a motor vehicle seat, the restraint harness including a lap restraint web attached to a tongue or buckle member and a shoulder restraint web coupled at one end thereof to the lap restraint web adjacent to or near the tongue or buckle, the shoulder web configured to extend over a shoulder and at least partially along a front torso of an occupant of the motor vehicle seat, the shoulder restraint web having a first side and a second side opposite the first side, an outer surface between the first and second sides and an inner surface opposite the outer surface and facing the motor vehicle seat,
an electrical component carried by the tongue or buckle member,
a channel member coupled to and between the inner and outer surfaces of the shoulder restraint web adjacent to and along one of the first and second sides of the shoulder restraint web such that the channel member and the one of the first and second sides of the shoulder restraint web define a passageway therebetween, and
one or more electrical wires operatively coupled to the electrical component and extending into and through the passageway such that the one or more electrical wires ride within the channel member alongside the shoulder restraint web.

14. The motor vehicle seat restraint system of claim 13, wherein the shoulder restraint web is coupled to the lap restraint web by wrapping a portion of the shoulder restraint web adjacent to the one end of the shoulder restraint web around the lap restraint web and then attaching the one end of the shoulder restraint web to itself,
and wherein a space is defined between the wrapped portion of the shoulder restraint web and the lap restraint web,
and wherein the one or more electrical wires extend from the electrical component into and through the space and then from the space into the passageway defined by the channel member.

15. The motor vehicle seat restraint system of claim 14, wherein the channel member defines a first open terminal end adjacent to the space,
and wherein the one or more electrical wires enter the passageway from the space via the first open terminal end.

16. The motor vehicle seat restraint system of claim 15, wherein the channel member defines a second open terminal end opposite the first open terminal end,
and wherein the one or more electrical wires exit the passageway via the second open terminal end.

17. The motor vehicle seat restraint system of claim 16 further comprising an electrical connector operatively coupled to the one or more electrical wires exiting the passageway via the second open terminal end.

18. A motor vehicle seat restraint system including integrated electrical wiring, comprising:
a web guide coupled to a seat back of a motor vehicle seat and defining a slot therethrough having a first width,
a restraint harness coupled to the motor vehicle seat, the restraint harness including a lap restraint web attached to a tongue or buckle member and a shoulder restraint web coupled at one end thereof to the lap restraint web adjacent to or near the tongue or buckle, the shoulder web configured to extend through the web guide and over a shoulder and at least partially along a front torso of an occupant of the motor vehicle seat, the shoulder restraint web having a first side and a second side opposite the first side,
an electrical component carried by the tongue or buckle member,
a channel member coupled to the shoulder restraint web adjacent to and along one of the first and second sides of the shoulder restraint web such that the channel member and the shoulder restraint web define a passageway therebetween, the combination of the shoulder restraint web and the channel member defining a second width between the other of the first and second sides of the shoulder restraint web and an outer edge of the channel member opposite the one of the first and second sides of the shoulder restraint web, the second width less than the first width, and
one or more electrical wires operatively coupled to the electrical component and extending into and through the passageway such that the one or more electrical wires ride within the channel member alongside the shoulder restraint web.

19. The motor vehicle seat restraint system of claim 18, wherein the channel member comprises a binding tape.

20. The motor vehicle seat restraint system of claim 18, wherein the electrical component comprises at least one of a sensor, an electrically controlled actuator and an electrically controlled indicator.

* * * * *